United States Patent
Eng et al.

(10) Patent No.: US 9,673,722 B2
(45) Date of Patent: Jun. 6, 2017

(54) QUASI-RESONANT HALF-BRIDGE CONVERTER AND CONTROL METHOD THEREOF

(71) Applicant: LITE-ON TECHNOLOGY CORP., Taipei (TW)

(72) Inventors: Wing-Keung Eng, Taipei (TW); Po-Jung Tseng, Taipei (TW); Wei-Lieh Lai, Taipei (TW)

(73) Assignees: Lite-On Technology Corp., Taipei (TW); Lite-On Electronics (Guanzhou) Limited, Guangzhou (CN)

( * ) Notice: Subject to any disclaimer, the term of this patent is extended or adjusted under 35 U.S.C. 154(b) by 0 days.

(21) Appl. No.: 14/738,984

(22) Filed: Jun. 15, 2015

(65) Prior Publication Data

US 2015/0381060 A1    Dec. 31, 2015

(30) Foreign Application Priority Data

Jun. 30, 2014 (TW) .............................. 103122536 A

(51) Int. Cl.
*H02M 3/335* (2006.01)
*H02M 3/337* (2006.01)
*H02M 1/00* (2006.01)

(52) U.S. Cl.
CPC .. *H02M 3/3376* (2013.01); *H02M 2001/0032* (2013.01); *H02M 2001/0054* (2013.01); *H02M 2001/0058* (2013.01); *Y02B 70/1433* (2013.01); *Y02B 70/1491* (2013.01); *Y02B 70/16* (2013.01)

(58) Field of Classification Search
CPC ............ Y02B 70/1416; Y02B 70/1433; Y02B 70/1458; Y02B 70/1475; Y02B 70/1491; H02M 2007/4815; H02M 2007/4822; H02M 3/33553; H02M 3/33592; H02M 3/335
USPC ............................................ 363/21.02, 21.03
See application file for complete search history.

(56) References Cited

U.S. PATENT DOCUMENTS

| | | | | |
|---|---|---|---|---|
| 2010/0182803 | A1* | 7/2010 | Nan ................... | H02M 3/33592 363/21.02 |
| 2011/0149607 | A1* | 6/2011 | Jungreis .............. | H02M 3/3376 363/21.02 |
| 2011/0211370 | A1* | 9/2011 | Luo ................... | H02M 3/33592 363/21.02 |
| 2011/0299301 | A1* | 12/2011 | Huang ................ | H02M 3/3376 363/17 |

* cited by examiner

*Primary Examiner* — Gary L Laxton
(74) *Attorney, Agent, or Firm* — Rosenberg, Klein & Lee

(57) ABSTRACT

A quasi-resonant half-bridge converter includes a switch unit including first and second switches that are coupled in series, a capacitor unit coupled to the switch unit in parallel, a rectifier unit, an output capacitor, and a transformer coupled to the aforesaid components. The first and second switches are respectively controlled using first and second control signals that have a constant frequency. Duty cycles of the first and second control signals may be adjusted based upon a DC output voltage across the output capacitor for promoting conversion efficiency of the converter when operating at light load.

9 Claims, 10 Drawing Sheets

QUASI-RESONANT HALF-BRIDGE CONVERTER AND CONTROL METHOD THEREOF

CROSS-REFERENCE TO RELATED APPLICATION

This application claims priority to Taiwanese Application No. 103122536, filed on Jun. 30, 2014.

BACKGROUND OF THE INVENTION

1. Field of the Invention

The invention relates to a converter, and more particularly to a quasi-resonant half-bridge converter and a control method thereof.

2. Description of the Related Art

Conventional direct current voltage converters may have some of the following drawbacks:

1. Poor conversion efficiency at light load. Conventional SRCs (series resonant converters) have primary side switches operating at ZVS (zero voltage switching), to thereby have higher conversion efficiency. However, since power of the load of the SRC is associated with a switching frequency of the primary side switches, the primary side switches may require a higher switching frequency at light load, so that the magnetic components and switch components of the converter may have a greater switching loss, resulting in poor conversion efficiency of the converter at light load.

2. Narrow range of operating power. Since conventional flyback quasi-resonant converters operate in one-quadrantal magnetization, a larger transformer may be required for promoting power range. In addition, since the power switches and the output capacitor thereof operate in BCM (boundary-conduction mode), higher stress and greater capacitance may be required.

3. Complicated switch control. Since conventional flyback quasi-resonant converters control conduction of switches by detecting voltages across the switches, or by detecting an end of power transmission of the transformer, the converters operate in BCM. Control circuits may need to have driving signals with variable-frequency control due to detection of relatively low points of the voltages across the switches, resulting in complicated control.

4. Difficult EMI (electromagnetic interference) design. Since conventional SRCs and quasi-resonant converters use variable-frequency switch control to generate a stable DC (direct current) output voltage, the operating frequency of the circuit may vary within a range, so that all of the frequency bands within the range should be considered into EMI design.

5. Poor ripple performance. Conventional flyback quasi-resonant converters operate in one-quadrantal magnetization, thereby requiring larger output capacitance for reducing output voltage ripple compared to those that operate in bi-quadrantal magnetization.

6. Larger size. When a conventional flyback quasi-resonant converter is applied to a load of greater than 60 watts, the transformer and the output capacitance required for the converter may be larger to fulfil requirements of circuit design due to greater output currents and ripples.

7. Components capable of withstanding higher voltages may be required. Since conventional clamping converters have a nature of a voltage across the switch being a sum of the output voltage and reflection of the output voltage to the primary side according to a turn ratio of the transformer, components capable of withstanding higher voltages may be required.

8. Low utilization rate. Conventional quasi-resonant converters primarily operate in one-quadrantal magnetization, thereby having a lower transformer utilization rate compared to those that operate in bi-quadrantal magnetization, and a larger transformer may be required to complete the circuit design.

SUMMARY OF THE INVENTION

Therefore, an object of the present disclosure is to provide a quasi-resonant half-bridge converter that may have better conversion efficiency at light load.

According to one aspect of the present disclosure, a quasi-resonant half-bridge converter is adapted to receive a direct-current (DC) input voltage and to output a DC output voltage to a load. The quasi-resonant half-bridge converter comprises:

a switch unit disposed to receive the DC input voltage, and including a first switch and a second switch that are electrically coupled in series, each of the first switch and the second switch having a body diode and a parasitic capacitor electrically coupled in parallel, being disposed to receive a respective one of a first control signal and a second control signal, and being configured to make or break electrical connection in response to the respective one of the first and second control signals;

a capacitor unit electrically coupled to the switch unit in parallel, and including a first capacitor and a second capacitor electrically coupled in series;

a transformer including a first winding disposed at a primary side, and a second winding and a third winding that are electrically coupled in series at a secondary side, each of the first, second and third windings having a polarity terminal and a non-polarity terminal, the polarity terminal of the third winding being electrically coupled to the non-polarity terminal of the second winding, the polarity terminal of the first winding being electrically coupled to a common node of the first switch and the second switch of the switch unit, the non-polarity terminal of the first winding being electrically coupled to a common node of the first capacitor and the second capacitor of the capacitor unit;

a rectifier unit electrically coupled to the second and third windings in parallel between the polarity terminal of the second winding and the non-polarity terminal of the third winding, and including a third switch and a fourth switch electrically coupled to each other;

an output capacitor electrically coupled between a common node of the second and third windings, and a common node of the third and fourth switches, and disposed to be electrically coupled to the load in parallel, the output capacitor having a DC output voltage across two terminals thereof; and a control circuit electrically coupled to the first and second switches of the switch unit, receiving the DC output voltage, and configured to generate, based upon the DC output voltage, the first and second control signals that have the same constant frequency, and to respectively adjust duty cycles of the first and second control signals such that a respective one of the first and second switches makes electrical connection when a voltage thereacross is close to zero.

Another object of the present disclosure is to provide a control method of the quasi-resonant half-bridge converter of the present disclosure.

According to another aspect of the present disclosure, a control method of a quasi-resonant half-bridge converter of the present disclosure is provided. The quasi-resonant half-bridge converter receives a direct-current (DC) input voltage, outputs a DC output voltage to a load, and includes:

a switch unit receiving the DC input voltage, and including a first switch and a second switch that are electrically coupled in series, each of the first switch and the second switch having a body diode and a parasitic capacitor electrically coupled in parallel;

a capacitor unit electrically coupled to the switch unit in parallel, and including a first capacitor and a second capacitor electrically coupled in series;

a transformer including a first winding disposed at a primary side, and a second winding and a third winding that are electrically coupled in series at a secondary side, each of the first, second and third windings having a polarity terminal and anon-polarity terminal, the polarity terminal of the first winding being electrically coupled to a common node of the first switch and the second switch of the switch unit, the non-polarity terminal of the first winding being electrically coupled to a common node of the first capacitor and the second capacitor of the capacitor unit;

a rectifier unit electrically coupled to the second and third windings in parallel between the polarity terminal of the second winding and the non-polarity terminal of the third winding, and including a third switch and a fourth switch electrically coupled to each other;

an output capacitor electrically coupled between a common node of the second and third windings, and a common node of the third and fourth switches, and disposed to be electrically coupled to the load in parallel, the output capacitor having a DC output voltage across two terminals thereof; and a control circuit electrically coupled to the first and second switches of the switch unit, and receiving the DC output voltage.

The control method comprises the steps of:
generating a first control signal and a second control signal that have a same constant frequency according to the DC output voltage, and that are respectively provided to the first switch and the second switch; and
respectively adjusting duty cycles of the first control signal and the second control signal according to the DC output voltage, such that a respective one of the first and second switches makes electrical connection when a voltage thereacross is close to zero.

BRIEF DESCRIPTION OF THE DRAWINGS

Other features and advantages of the present disclosure will become apparent in the following detailed description of embodiments with reference to the accompanying drawings, of which.

DETAILED DESCRIPTION OF THE EMBODIMENTS

Figure 1:
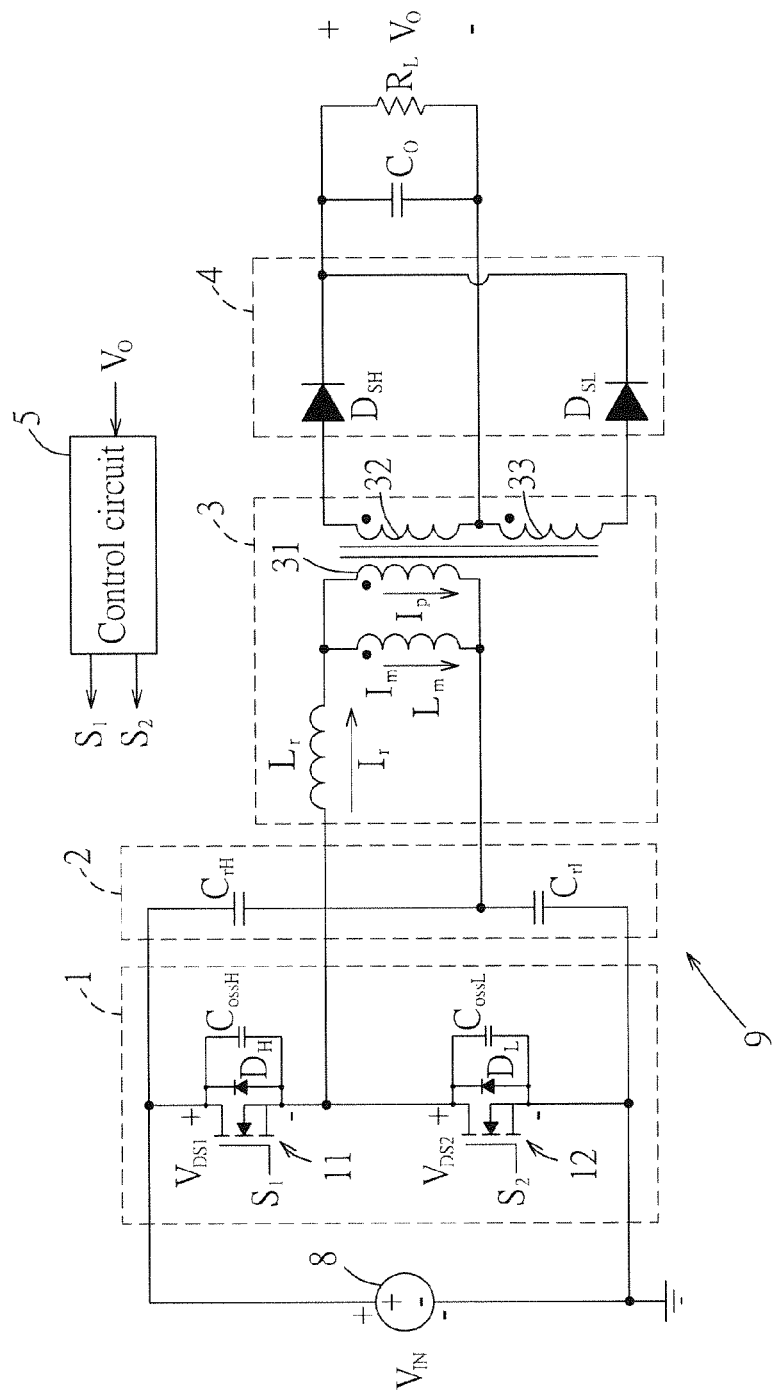
FIG. 1 is a schematic circuit diagram illustrating a first embodiment of the quasi-resonant half-bridge converter according to the present disclosure.

Referring to FIG. 1, the first embodiment of the quasi-resonant half-bridge converter 9 according to this disclosure is adapted to be electrically coupled to an input power source 8, such as a DC (direct current) power source, and a load $R_L$, and converts a DC input voltage $V_{IN}$ received from the input power source 8 into a DC output voltage $V_O$ that is applied to the load $R_L$. The quasi-resonant half-bridge converter 9 includes a switch unit 1, a capacitor unit 2, a transformer 3, a rectifier unit 4, an output capacitor $C_O$ and a control circuit 5.

The switch unit 1 is electrically coupled to the input power source 8 in parallel, and includes a first switch 11 and a second switch 12 electrically coupled in series. Each of the first and second switches 11, 12 has a body diode $D_H$, $D_L$ and a parasitic capacitor $C_{ossH}$, $C_{ossL}$, receives a respective one of a first control signal $S_1$ and a second control signal $S_2$, and makes or breaks electrical connection in response to the respective one of the first and second control signals $S_1$, $S_2$. In this embodiment, each of the switches 11, 12 is an N-type power transistor, and the body diode $D_H$, $D_L$ and the parasitic capacitor $C_{oosH}$, $C_{oosL}$ are respectively and electrically coupled in parallel across a source terminal and a drain terminal of the respective one of the N-type power transistors 11, 12. Gate terminals of the N-type power transistors 11, 12 receive the first and second control signals $S_1$, $S_2$, respectively.

The capacitor unit 2 is electrically coupled to the input power source 8 in parallel, and includes a first capacitor $C_{rH}$ and a second capacitor $C_{rL}$ electrically coupled in series.

The transformer 3 includes a first winding 31 disposed at a primary side, and a second winding 32 and a third winding 33 that are electrically coupled in series at a secondary side. Each of the windings 31-33 has a polarity terminal and a non-polarity terminal. The polarity terminal of the third winding 33 is electrically coupled to the non-polarity terminal of the second winding 32.

The polarity terminal of the first winding 31 is electrically coupled to a common node of the first and second switches 11, 12 of the switch unit 1. The non-polarity terminal of the first winding 31 is electrically coupled to a common node of the first and second capacitors $C_{rH}$, $C_{rL}$ of the capacitor unit 2. Since non-ideal factors are taken into consideration of the transformer 3 shown in FIG. 1, the transformer 3 includes a magnetizing inductor $L_m$ in parallel with the first winding 31, and a resonant inductor $L_r$ between the polarity terminal of the first winding 31 and the common node of the first and second switches 11, 12.

The rectifier unit 4 is electrically coupled to the second and third windings 32, 33 between the polarity terminal of the second winding 32 and the non-polarity terminal of the third winding 33, and includes at least one unidirectional conducting device such as a diode. In this embodiment, the rectifier unit 4 includes a first diode $D_{SH}$ and a second diode $D_{SL}$. Each of the first and second diodes $D_{SH}$, $D_{SL}$ has an anode terminal and a cathode terminal. The cathode terminal of the second diode $D_{SL}$ is electrically coupled to the cathode terminal of the first diode $D_{SH}$. In this embodiment, each of the diodes $D_{SH}$, $D_{SL}$ is, for example, a Schottky diode to serve as a switch.

The output capacitor $C_O$ is electrically coupled between the common node of the second and third windings 32, 33 and the common node of the first and second diodes $D_{SH}$, $D_{SL}$. The load $R_L$ is electrically coupled to the output capacitor $C_O$ in parallel, and a voltage across the load $R_L$ is the DC output voltage $V_O$.

The control circuit 5 generates the first control signal $S_1$ and the second control signal $S_2$ that have the same constant frequency based upon the DC output voltage $V_O$, and adjusts duty cycles of the first and second control signals $S_1$, $S_2$ based upon the DC output voltage $V_O$.

Figure 2:
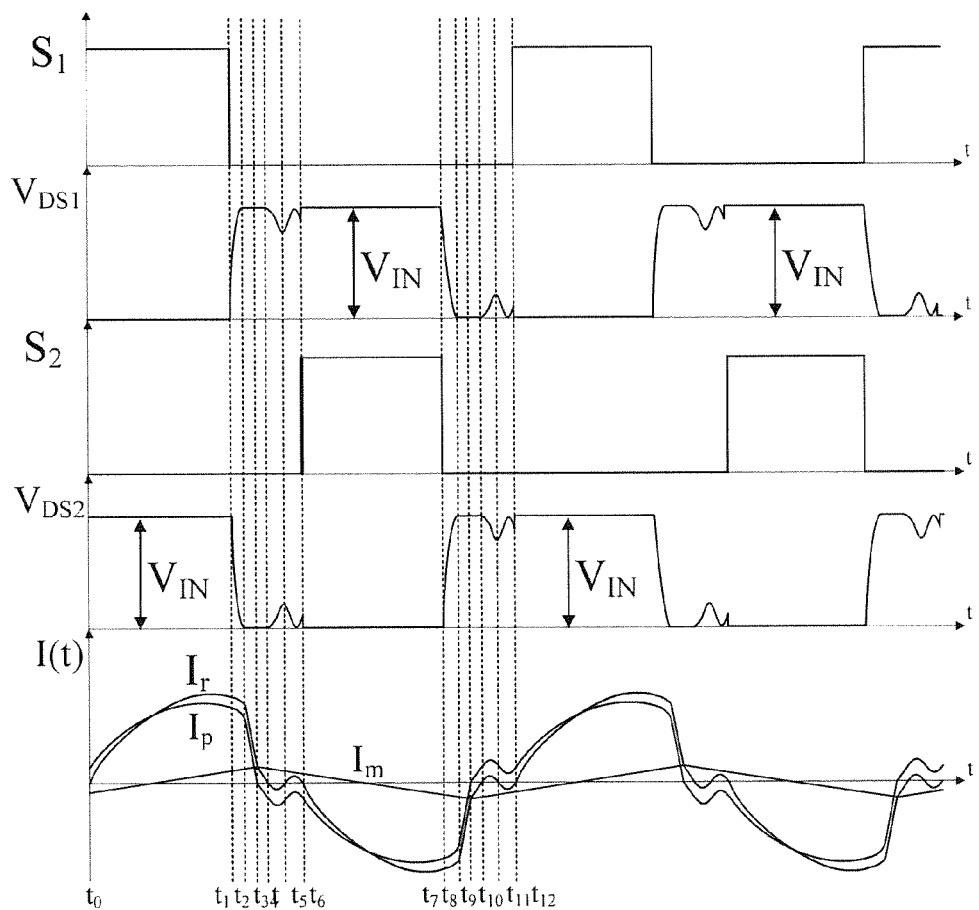
FIG. 2 is a timing diagram illustrating relationships among signals in the first embodiment.

Referring to FIGS. 1 and 2, FIG. 2 is a timing diagram that has a horizontal axis being a time axis (t), and that illustrates, for the first embodiment, relationships among the first control signal $S_1$, the second control signal $S_2$, a voltage $V_{DS1}$ across the first switch 11, a voltage $V_{DS2}$ across the second switch 12, a primary side current $I_P$, a resonant inductance current $I_r$ and a magnetizing inductance current $I_m$. Positive directions of current flows of the primary side current $I_P$, the resonant inductance current $I_r$ and the magnetizing inductance current $I_m$ are indicated using arrows marked in FIG. 1.

Figure 3:
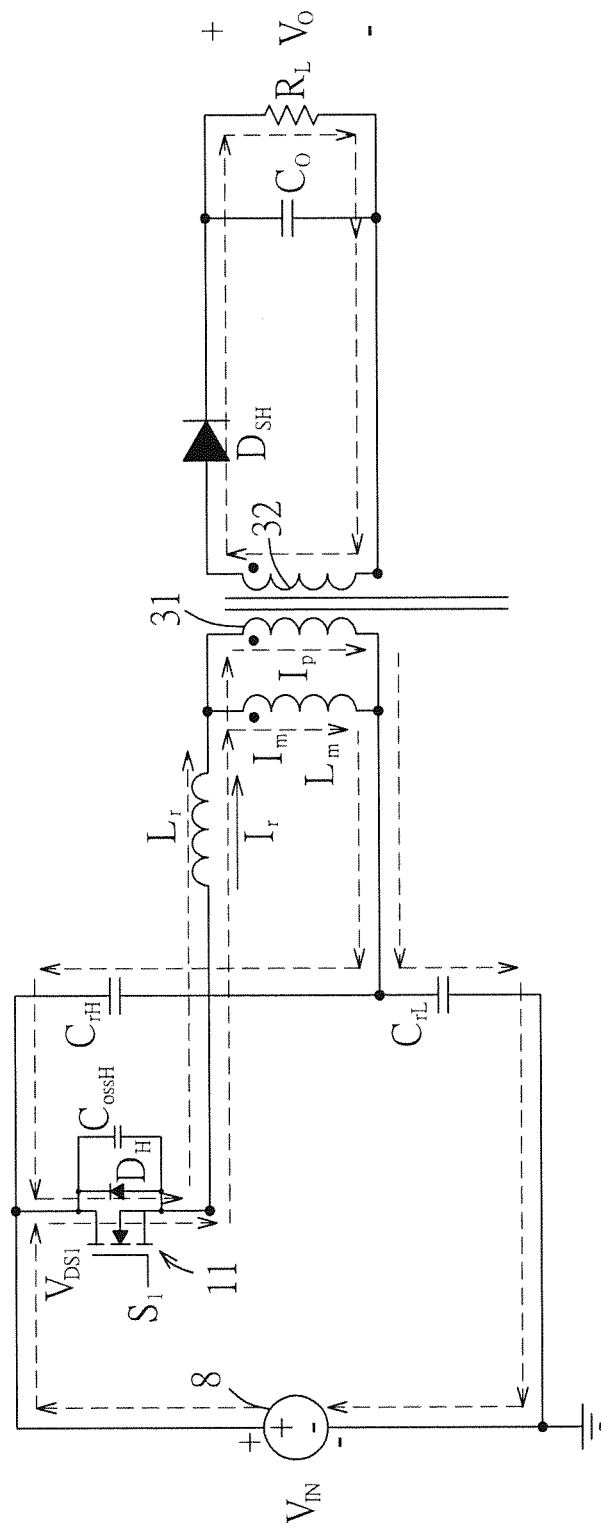
FIG. 3 is a schematic circuit diagram illustrating circuit operation of the first embodiment during a first time interval.

Referring to FIGS. 2 and 3, dotted lines and arrows marked in FIG. 3 indicate conduction paths of the circuit, and non-conducting components are omitted in FIG. 3. When $t_0 \le t < t_1$, which represents a first time interval, the first control signal $S_1$ has a logic level "1" that causes the first switch 11 to make electrical connection, and the second control signal $S_2$ has a logic level "0" that causes the second switch 12 to break electrical connection. The DC input voltage $V_{IN}$ results in the primary side current $I_P$ at the first winding 31 via the first switch 11 and the resonant inductor $L_r$, and causes conduction of the first diode $D_{SH}$ and non-conduction of the second diode $D_{SL}$ via the second winding 32 of the transformer 3, to thereby transfer energy to the load $R_L$. At this time, since the first diode $D_{SH}$ makes electrical connection, a voltage across the second winding 32 of the transformer 3 is the DC output voltage $V_O$, and is reflected to the two terminals of the first winding 31, such that the magnetizing inductance current $I_m$ starts to increase linearly since a voltage across the magnetizing inductor $L_m$ is the same as the voltage reflected to the first winding 31. In addition, the first capacitor $C_{rH}$ charges the second capacitor $C_{rL}$, and releases energy to the load $R_L$ due to conduction of the first switch 11.

Figure 4:
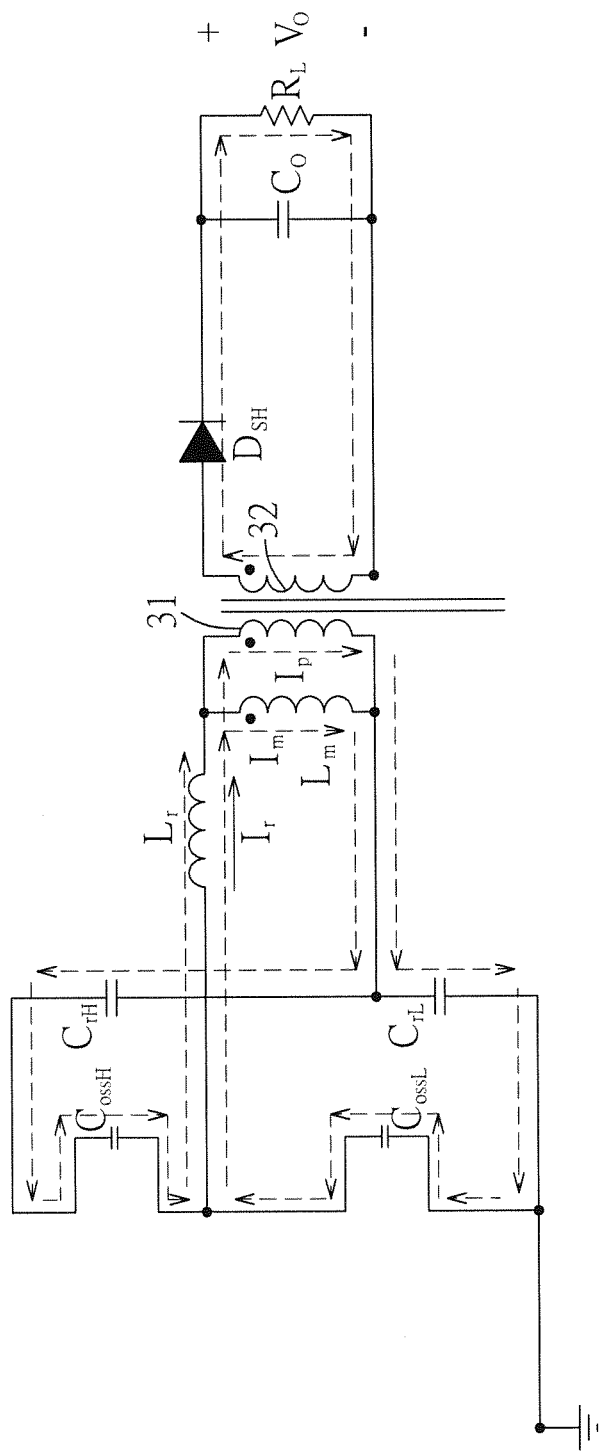
FIG. 4 is a schematic circuit diagram illustrating circuit operation of the first embodiment during a second time interval.

Referring to FIGS. 2 and 4, dotted lines and arrows marked in FIG. 4 indicate conduction paths of the circuit, and non-conducting components are omitted in FIG. 4. When $t=t_1$, the first control signal S1 changes to logic level 0 that makes the first switch 11 non-conduct. At this time, the resonant inductance current $I_r$ continues to flow, and continues to provide energy to the load $R_L$ via the primary side current $I_P$ that flows through the first winding 31, and via the transformer 3.

When $t_1 \le t < t_2$, which represents a second time interval, the first capacitor $C_{rH}$ of the capacitor unit 2 charges the parasitic capacitor $C_{ossH}$ of the first switch 11 and the second capacitor $C_{rL}$, and provides energy to the load $R_L$ at the same time. At this time, energy is released from the parasitic capacitor $C_{ossL}$ of the second switch 12 to the parasitic capacitor $C_{ossH}$ of the first switch 11 via the resonant inductance current $I_r$.

Figure 5:
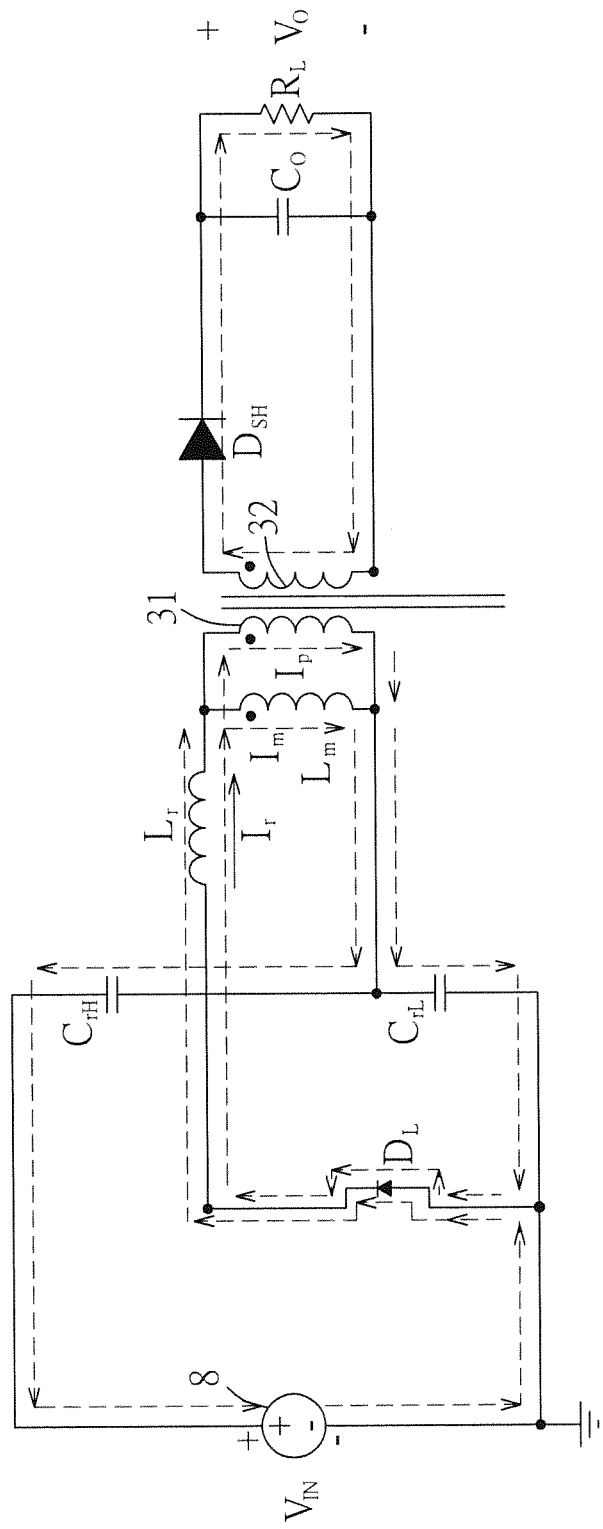
FIG. 5 is a schematic circuit diagram illustrating circuit operation of the first embodiment during a third time interval.

Referring to FIGS. 2 and 5, dotted lines and arrows marked in FIG. 5 indicate conduction paths of the circuit, and non-conducting components are omitted in FIG. 5. When $t=t_2$, the parasitic capacitor $C_{ossH}$ of the first switch 11 is charged to have the voltage $V_{DS1}$ with a magnitude of that of the DC input voltage $V_{IN}$, so that the parasitic capacitor $C_{ossH}$ of the first switch 11 is considered to have an open circuit state, and the voltage $V_{DS2}$ across the parasitic capacitor $C_{ossL}$ of the second switch 12 is discharged to zero, which makes the body diode $D_L$ of the second switch 12 conduct. At this time, the resonant inductance current $I_r$ continues to flow, and continues to provide energy to the load $R_L$ via the primary side current $I_P$ that flows through the first winding 31, and via the transformer 3.

When $t_2 \le t < t_3$, which represents a third time interval, the first capacitor $C_{rH}$ of the capacitor unit 2 charges the second capacitor $C_{rL}$ via the input power source 8 and the body diode $D_L$ of the second switch 12, and provides energy to the load $R_L$ at the same time. In this time interval, the voltage across the first capacitor $C_{rH}$ gradually reduces, and the voltage across the second capacitor $C_{rL}$ gradually increases, so that the primary side current $I_P$ that flows through the first winding 31 gradually reduces.

Figure 6:
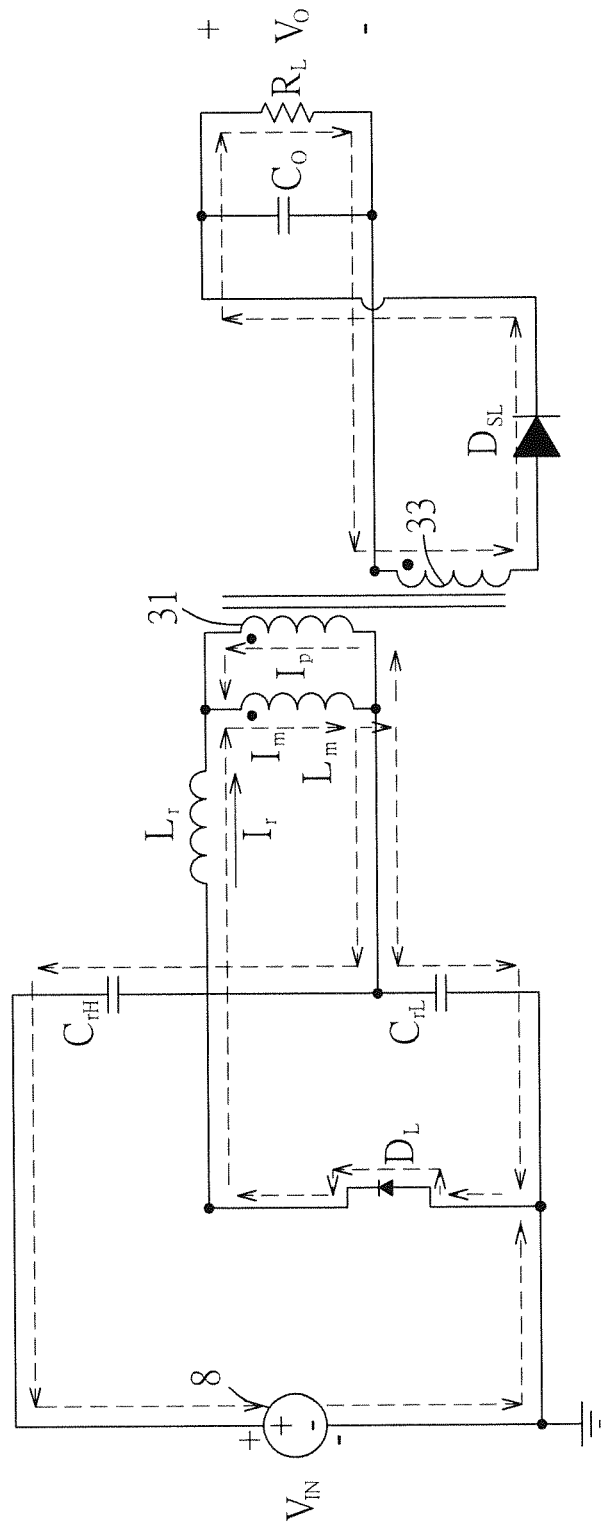
FIG. 6 is a schematic circuit diagram illustrating circuit operation of the first embodiment during a fourth time interval.

Referring to FIGS. 2 and 6, dotted lines and arrows marked in FIG. 6 indicate conduction paths of the circuit, and non-conducting components are omitted in FIG. 6. When $t=t_3$, the primary side current $I_P$ that flows through the first winding 31 is reduced to zero. When $t_3 \le t < t_4$, which represents a fourth time interval, the resonant inductance current $I_r$ continues to flow and gradually reduces, and the primary side current $I_P$ that flows through the first winding 31 is negative, which represents the current direction being reversed, which makes the second diode $D_{SL}$ of the rectifier unit 4 conduct, and which makes the first diode $D_{SH}$ non-conduct. At this time, the DC output voltage $V_O$ is reflected to the primary side of the transformer 3, i.e., the two terminals of the first winding 31, so that the voltage across the magnetizing inductor $L_m$ is clamped at $-nV_O$, where n is a turns ratio of the first winding 31 to the second winding 32. Energy starts to be released from the magnetizing inductor $L_m$ to the load $R_L$, and the magnetizing inductance current $I_m$ is linearly reduced. The first capacitor $C_{rH}$ of the capacitor unit 2 continues to release energy with a gradually reduced voltage thereacross, and the second capacitor $C_{rL}$ stores energy with a gradually increased voltage thereacross.

Figure 7:
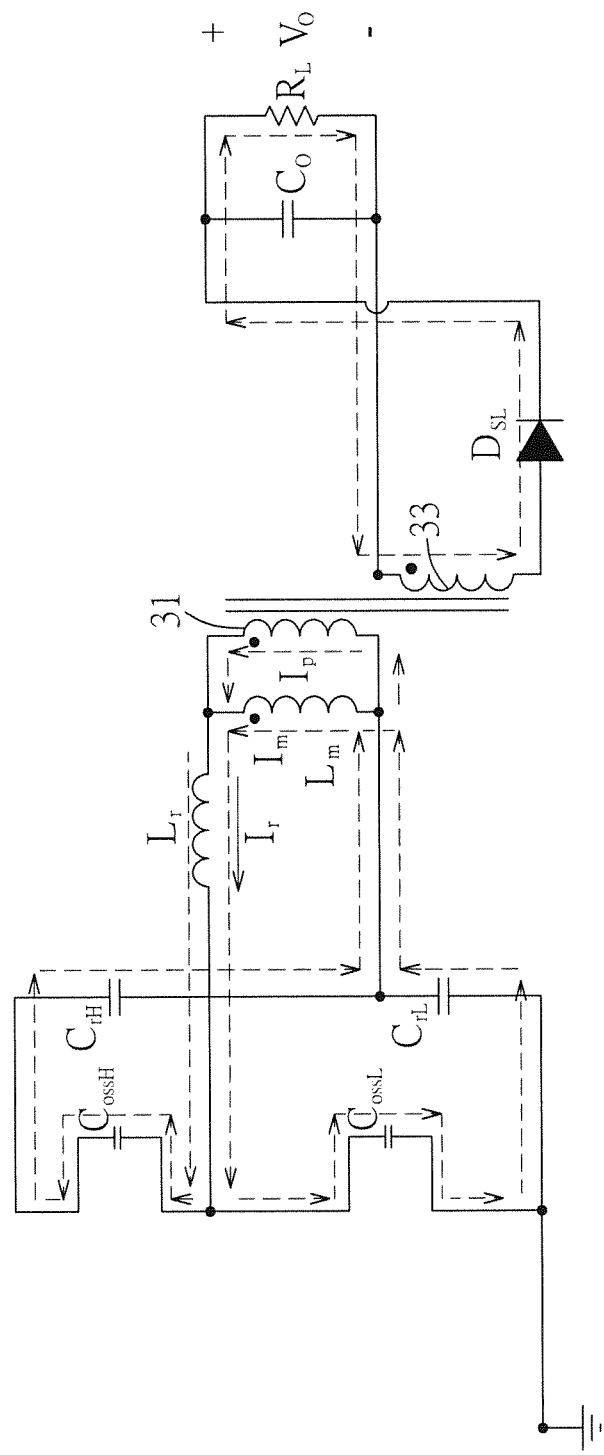
FIG. 7 is a schematic circuit diagram illustrating circuit operation of the first embodiment during a fifth time interval.

Referring to FIGS. 2 and 7, dotted lines and arrows marked in FIG. 7 indicate conduction paths of the circuit, and non-conducting components are omitted in FIG. 7. When $t=t_4$, the resonant inductance current $I_r$ is reduced to zero. When $t_4 \le t < t_5$, which represents a fifth time interval, the second capacitor $C_{rL}$ of the capacitor unit 2 starts to release energy, and the resonant inductor $L_r$ starts to reversedly store energy, such that the resonant inductance current $I_r$ becomes negative, which represents the current direction being reversed. The primary side current $I_P$ that flows through the first winding 31 is still negative, the second diode $D_{SL}$ of the rectifier unit 4 makes electrical connection, and the first diode $D_{SH}$ breaks electrical connection, to thereby transfer energy to the load $R_L$.

Since the resonant inductance current $I_r$ becomes negative, the parasitic capacitor $C_{ossH}$ of the first switch 11 and the second capacitor $C_{rL}$ of the capacitor unit 2 start to release energy, and the voltage $V_{DS1}$ across the first switch 11 slightly reduces from the magnitude of the DC input voltage $V_{IN}$. At the same time, the parasitic capacitor $C_{ossL}$ of the second switch 12 and the first capacitor $C_{rH}$ of the capacitor unit 2 start to store energy, and the voltage $V_{DS2}$ across the second switch 12 slightly increases.

Figure 8:
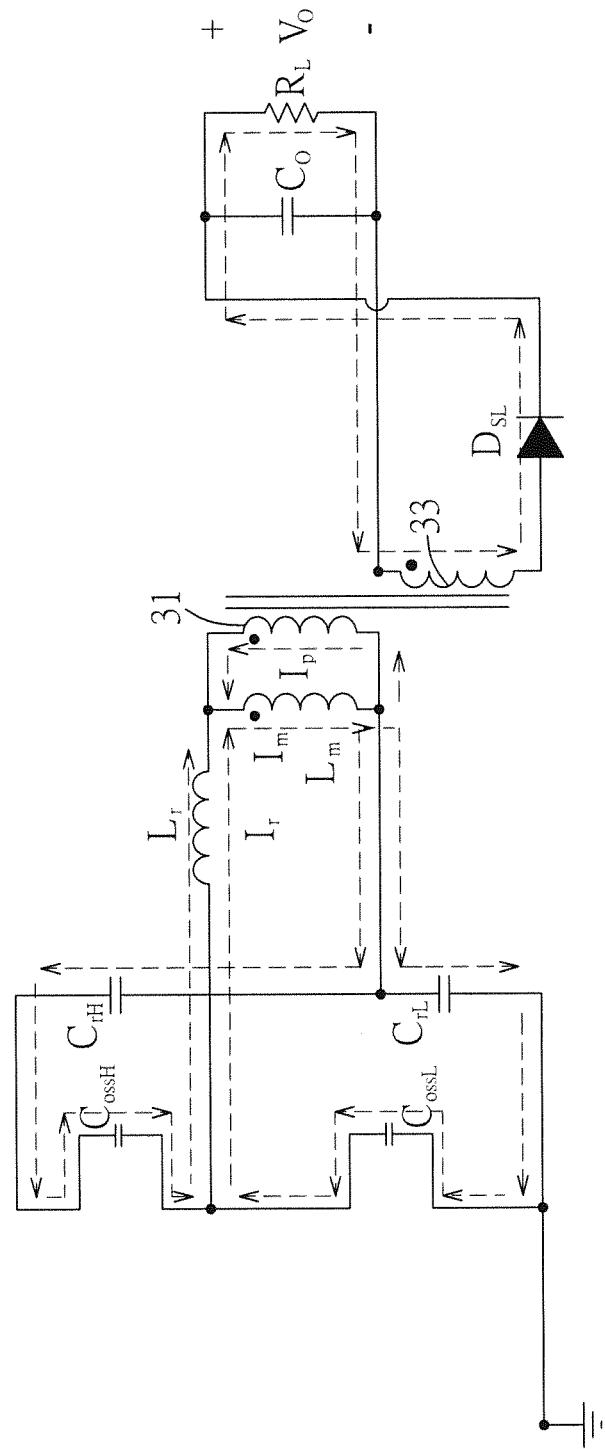
FIG. 8 is a schematic circuit diagram illustrating circuit operation of the first embodiment during a sixth time interval.

Referring to FIGS. 2 and 8, dotted lines and arrows marked in FIG. 8 indicate conduction paths of the circuit, and non-conducting components are omitted in FIG. 8. When $t=t_5$, the resonant inductance current $I_r$ is zero again. When $t_5 \leq t < t_6$, which represents a sixth time interval, the resonant inductance current $I_r$ becomes positive again, i.e., the current direction thereof changes again. The first capacitor $C_{rH}$ of the capacitor unit 2 starts to release energy, so that the second capacitor $C_{rL}$ starts to store energy. The primary side current $I_P$ is still negative, which causes the second diode $D_{SL}$ of the rectifier unit 4 to conduct, and which causes the first diode $D_{SH}$ to non-conduct, to thereby transfer energy to the load $R_L$. At this time, the parasitic capacitor $C_{ossH}$ of the first switch 11 starts to store energy again, and the parasitic capacitor $C_{ossL}$ of the second switch 12 starts to release energy again. When $t=t_6$, which represents an end of the sixth time interval, the logic level of the second control signal $S_2$ changes to 1.

During a time interval of $t_6 \leq t < t_{12}$, operations of the quasi-resonant half-bridge converter 9 are analogous to, and are an antithesis of those described for $t_0 \leq t < t_6$. That is, the primary side current $I_P$, the magnetizing inductance current $I_m$ and the resonant inductance current $I_r$ between $t_6$ and $t_{12}$ are complementary to those between $t_0$ and $t_6$, and have symmetric magnitudes with different positive/negative signs. Since circuit operations during the time interval of $t_6 \leq t < t_{12}$ are similar to those described above in connection with the time interval of $t_0 \leq t < t_6$, details thereof are not repeated herein for the sake of brevity.

In this embodiment, the first control signal $S_1$ and the second control signal $S_2$ operate at the same constant frequency, which is equal to a resonant frequency of the conventional SRC (series resonant converter), and duty cycles thereof are adjusted based upon the DC output voltage $V_O$, to thereby control the first and second switches 11, 12 of the switch unit 1 to make or break electrical connections. The first switch 11 is switched between conducting and non-conducting states based upon the duty cycle only when the voltage $V_{DS1}$ across the first switch 11 is close to zero. The second switch 12 is switched between conducting and non-conducting states based upon the duty cycle only when the voltage $V_{DS2}$ across the second switch 12 is close to zero. When the quasi-resonant half-bridge converter 9 operates at full load, the duty cycles of the first and second control signals $S_1$, $S_2$ may be the same as that of control signals of the conventional SRC, so that the quasi-resonant half-bridge converter 9 may have a conversion efficiency comparable to that of the conventional SRC when operating at full load. When the quasi-resonant half-bridge converter 9 operates at light load, for example, power of the load $R_L$ is 20% of that at full load, the duty cycles of the first and second control signals $S_1$, $S_2$ may be adjusted for provision of the DC output voltage $V_O$. Since the quasi-resonant half-bridge converter 9 still operates at the same frequency, switching loss of the transformer 3 and the switch unit 1 may be smaller than that of the conventional SRC, so that the quasi-resonant half-bridge converter 9 may have better conversion efficiency compared to that of the conventional SRC when operating at light load.

Particularly, in an equivalent resonant model of the quasi-resonant half-bridge converter 9 according to this disclosure, the resonant inductor $L_r$, the first and second capacitors $C_{rH}$, $C_{rL}$ that serve as resonant capacitances, the magnetizing inductance $L_m$, and the parasitic capacitors $C_{ossH}$, $C_{ossL}$ of the first and second switches 11, 12 participate in resonance, while inductance of the resonant inductor $L_r$ and capacitances of the first and second capacitors $C_{rH}$, $C_{rL}$ are properly designed. That is, the resonant frequency of the quasi-resonant half-bridge converter 9 is determined according to the resonant inductor $L_r$, the first and second capacitors $C_{rH}$, $C_{rL}$ of the capacitor unit 2, the magnetizing inductor $L_m$, and the parasitic capacitors $C_{ossH}$, $C_{ossL}$ of the first and second switches 11, 12 of the switch unit 1, which is different from the conventional quasi-resonant converter in which the magnetizing inductor and the parasitic capacitors of the switches participate in resonance. In addition, since oscillations of the voltages $V_{DS1}$, $V_{DS2}$ respectively across the first and second switches 11, 12 of the switch unit 1 are small during a resonance interval, which refers to a time interval after reducing to 0 volt during $t_1 \sim t_6$ and $t_7 \sim t_{12}$, switching loss at conductions of the first and second switches 11, 12 may be significantly reduced, thereby promoting conversion efficiency of the quasi-resonant half-bridge converter 9.

Figure 9:
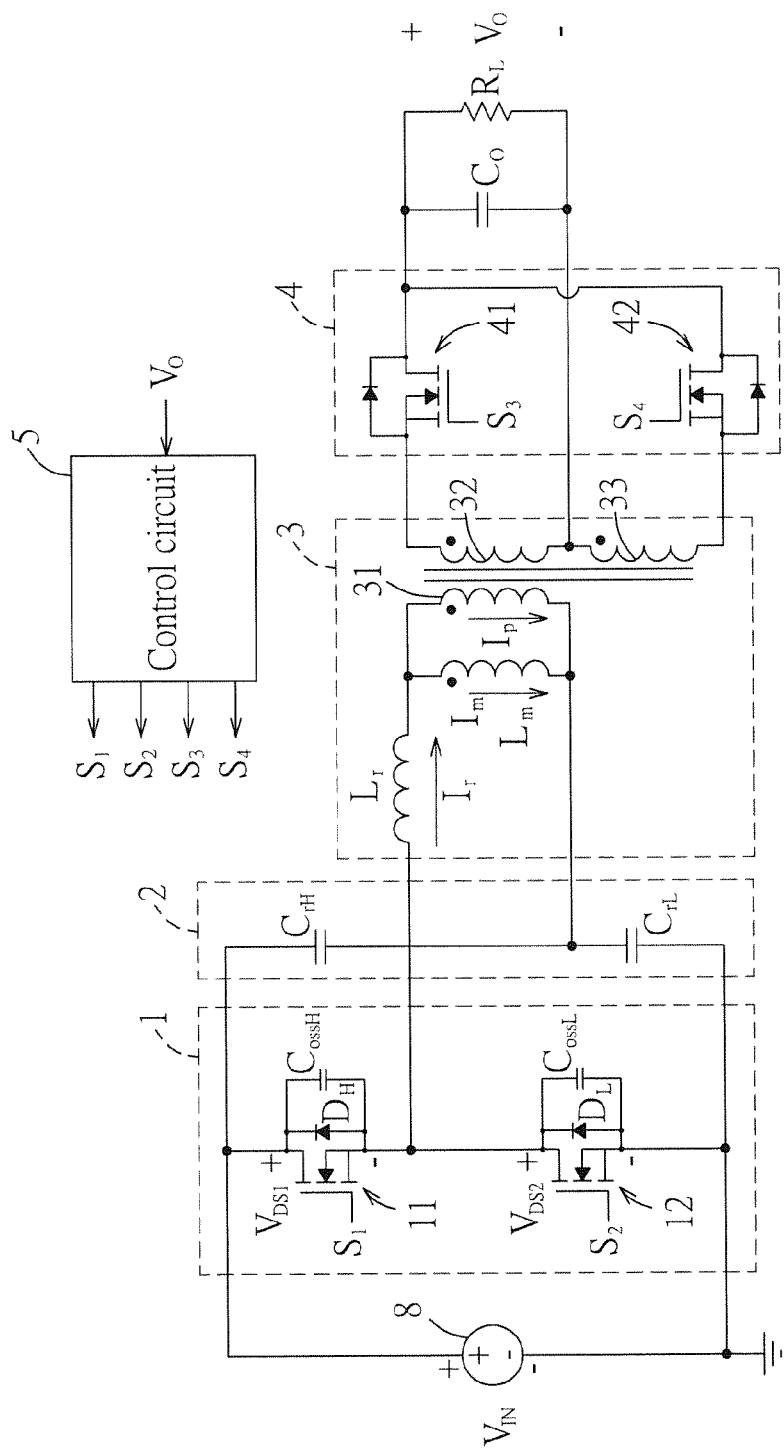
FIG. 9 is a schematic circuit diagram illustrating a second embodiment of the quasi-resonant half-bridge converter according to the present disclosure.

Referring to FIG. 9, the second embodiment of the quasi-resonant half-bridge converter 9 according to the present disclosure is shown to be similar to the first embodiment, and differs in that: in the rectifier unit 4, a third switch 41 and a fourth switch 42 are used to replace the first diode $D_{SH}$ and the second diode $D_{SL}$, respectively. In this embodiment, each of the third and fourth switches 41, 42 is an N-type power transistor, receives a respective one of a third control signal $S_3$ and a fourth control signal $S_4$, and makes or breaks electrical connection in response to the respective one of the third and fourth control signals $S_3$, $S_4$.

Figure 10:
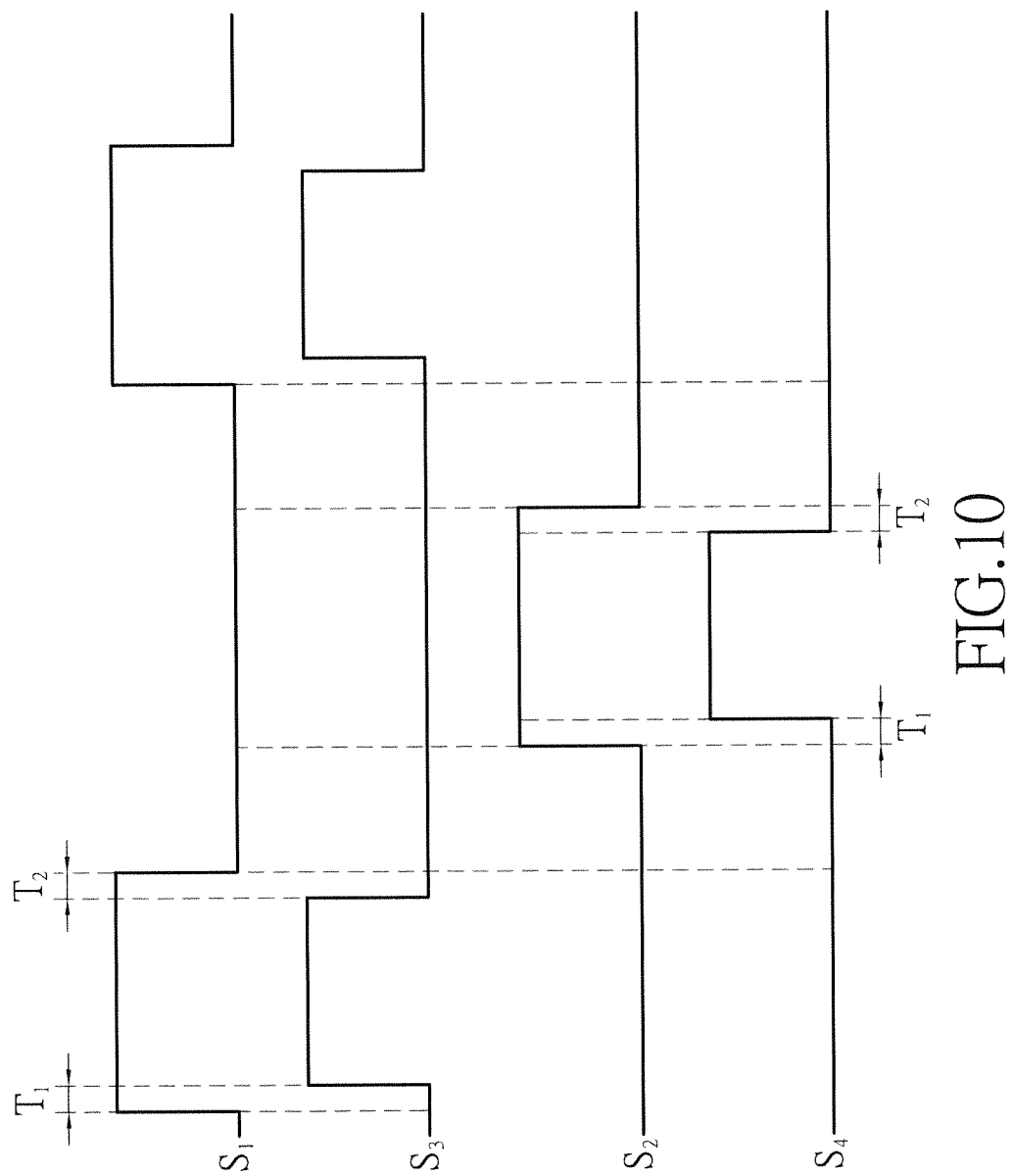
FIG. 10 is a timing diagram illustrating relationships among control signals in the second embodiment.

Referring to FIGS. 9 and 10, FIG. 10 is a timing diagram that has a horizontal axis being a time axis (t), and that illustrates, for the second embodiment, relationships among the first, second, third and fourth control signals $S_1$, $S_2$, $S_3$, and $S_4$. When both of the first and second control signals $S_1$, $S_2$ have the logic level "0", both of the first and second switches 11, 12 do not conduct, and the quasi-resonant half-bridge converter 9 operates in a dead zone interval. At this time, in the transformer 3, energy at the secondary side is greater than that at the primary side, which may result in a reverse current flowing back to the primary side in the transformer 3. In the first embodiment, the rectifier unit 4 uses such as the Schottky diodes that have a characteristic of unidirectional conduction to avoid the above condition of reverse current flow. In the second embodiment, each of the third and fourth control signals $S_3$, $S_4$ is controlled to make a logical transition from logic 0 to logic 1 after that of the respective one of the first and second control signals $S_1$, $S_2$ by a first predetermined time period $T_1$, and to make a logical transition from logic 1 to logic 0 before that of the respective one of the first and second control signals $S_1$, $S_2$ by a second predetermined time period $T_2$, so that each of the third and fourth switches 41, 42 is controlled to make electrical connection the first predetermined time period $T_1$ after the respective one of the first and second switches 11, 12 makes electrical connection, and to break electrical connection the second predetermined time period $T_2$ before the respective one of the first and second switches 11, 12 breaks electrical connection. In such a manner, the above condition of reverse current flow may be prevented. Note that the first predetermined time period $T_1$ and the second predetermined time period $T_2$ may be the same or different.

Since the N-type power transistors (the third and fourth switches 41, 42) of the rectifier unit 4 used in the second embodiment have relatively lower on-state resistances compared to those of the first and second diodes $D_{SH}$, $D_{SL}$ used in the first embodiment, the power loss thereof may be relatively lower, thereby promoting overall conversion efficiency.

In summary, embodiments of the present disclosure may have the following advantages:

1. Better conversion efficiency when operating at light load. The present disclosure uses the first and second control signals $S_1$, $S_2$ that have the constant frequency to control conductions of the switches 11, 12 of the switch unit 1 through adjustment of the duty cycles, to thereby prevent increase of the switching frequency of the switches, and effectively reduce switching loss compared to the conventional SRCs.

2. Broader range of operating power. Since the transformer 3 of the present disclosure operates in bi-quadrantal magnetization, a utilization rate of the transformer 3 is thus promoted, to thereby achieve a broader range of operating power compared to the conventional flyback quasi-resonant converters.

3. Simpler control of the switches 11, 12 of the switch unit 1. Since the switches 11, 12 of the switch unit 1 are controlled using the first and second control signals $S_1$, $S_2$ that have the constant frequency, it is not required for the present disclosure to detect relatively low points of voltages across the switches, and to operate with variable frequency for stabilizing the output voltage, which are required for the conventional flyback quasi-resonant converters, to thereby effectively simplify switch control.

4. Easier for EMI design. Since the first and second control signals $S_1$, $S_2$ of the present disclosure operate at the constant frequency, the frequency range taken into consideration for EMI design is fixed, to thereby effectively simplify EMI design compared to the conventional flyback quasi-resonant converters.

5. Better ripple performance. Since the converter 9 of the present disclosure operates with a structure of bi-quadrantal magnetization, a ripple frequency of the output capacitor is twice the switching frequency, so that fewer capacitors may be used to achieve the same ripple performance of the conventional converters that operate with a structure of unidirectional one-quadrantal magnetization. Therefore, the present disclosure may have relatively better ripple performance compared to that of the conventional flyback quasi-resonant converters.

6. Smaller size. Since the converter 9 of the present disclosure operates with a structure of bi-quadrantal magnetization, currents flowing through the transformer 3 may be uniformly distributed to the two switches 11, 12 of the switch unit 1, to thereby alleviate issues of current overheating. Therefore, the transformer 3 and the output capacitor $C_O$ may respectively have a smaller size and a smaller capacitance to achieve the same output power. Accordingly, the converter 9 of the present disclosure may have a relatively smaller size compared to the conventional flyback quasi-resonant converters.

7. Components capable of withstanding lower voltages may be used. Due to structural characteristics, the converter 9 of the present disclosure may use components capable of withstanding relatively lower voltages compared to the conventional active clamping converters.

8. Higher utilization rate of the transformer 3. Since the converter 9 of the present disclosure operates in bi-quadrantal magnetization, the operating range of power may be promoted, to thereby have a relatively higher utilization rate of the transformer 3 compared to the conventional quasi-resonant converters under the same output power condition.

While the present invention has been described in connection with what are considered the most practical embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A quasi-resonant half-bridge converter adapted to receive a direct-current (DC) input voltage and to output a DC output voltage to a load, said quasi-resonant half-bridge converter comprising:

a switch unit disposed to receive the DC input voltage, and including a first switch and a second switch that are electrically coupled in series, each of said first switch and said second switch having a body diode and a parasitic capacitor electrically coupled in parallel, being disposed to receive a respective one of a first control signal and a second control signal, and being configured to make or break electrical connection in response to the respective one of the first and second control signals;

a capacitor unit electrically coupled to said switch unit in parallel, and including a first capacitor and a second capacitor electrically coupled in series;

a transformer including a first winding disposed at a primary side, and a second winding and a third winding that are electrically coupled in series at a secondary side, each of said first, second and third windings having a polarity terminal and a non-polarity terminal, said polarity terminal of said third winding being electrically coupled to said non-polarity terminal of said second winding, said polarity terminal of said first winding being electrically coupled to a common node of said first switch and said second switch of said switch unit, said non-polarity terminal of said first winding being electrically coupled to a common node of said first capacitor and said second capacitor of said capacitor unit;

a rectifier unit electrically coupled to said second and third windings in parallel between said polarity terminal of said second winding and said non polarity terminal of said third winding, and including a third switch and a fourth switch electrically coupled to each other;

an output capacitor electrically coupled between a common node of said second and third windings, and a common node of said third and fourth switches, and disposed to be electrically coupled to the load in parallel, said output capacitor having a DC output voltage across two terminals thereof; and a control circuit electrically coupled to said first and second switches of said switch unit, receiving the DC output voltage, and, based upon the DC output voltage, generating the first and second control signals with constant and equal frequencies, and based upon the DC output voltage, respectively adjusting duty cycles of the first and second control signals such that said first and second switches respectively make electrical connection when a voltage thereacross is close to zero;

wherein said control circuit further generates a third control signal and a fourth control signal that are respectively provided to said third switch and said fourth switch, such that each of said third and fourth switches makes or breaks electrical connection according to a respective one of the third and fourth control signals; and wherein said control circuit configures each of the third and fourth control signals to make logic transition that causes a respective one of said third and fourth switches to make electrical connection after, by a first predetermined time period, logic transition of a respective one of the first and second control signals that causes a respective one of said first and second switches to make electrical connection, and configures each of the first and second control signals to make logic transition that causes a respective one of said first and second switches to break electrical connection after, by a second predetermined time period, logic transition of a respective one of the third and fourth control signals that causes a respective one of said third and fourth switches to break electrical connection.

2. The quasi-resonant half-bridge converter according to claim 1, wherein said transformer has a magnetizing inductor in parallel with said first winding, and a resonant inductor between said polarity terminal of said first winding and said common node of said first switch and said second switch, said quasi-resonant half-bridge converter having a resonant frequency associated with said resonant inductor, said first and second capacitors of said capacitor unit, said magnetizing inductor, said parasitic capacitor of said first switch and said parasitic capacitor of said second switch.

3. The quasi-resonant half-bridge converter according to claim 1, wherein each of said first, second, third and fourth switches is an N-type power transistor.

4. The quasi-resonant half-bridge converter according to claim 3, wherein said control circuit configures each of the third and fourth control signals to make transition from logic 0 to logic 1 after transition from logic 0 to logic 1 of a respective one of the first and second control signals by the first predetermined time period, and configures each of the first and second control signals to make transition from logic 1 to logic 0 after transition from logic 1 to logic 0 of the respective one of the third and fourth control signals by the second predetermined time period, whereby each of said third and fourth switches makes electrical connection the first predetermined time period after a respective one of said first and second switches makes electrical connection, and each of said third and fourth switches breaks electrical connection the second predetermined time period before the respective one of said first and second switches breaks electrical connection.

5. A control method of a quasi-resonant half-bridge converter that receives a direct-current (DC) input voltage, that outputs a DC output voltage to a load, and that includes:
a switch unit receiving the DC input voltage, and including a first switch and a second switch that are electrically coupled in series, each of the first switch and the second switch having a body diode and a parasitic capacitor electrically coupled in parallel;
a capacitor unit electrically coupled to the switch unit in parallel, and including a first capacitor and a second capacitor electrically coupled in series;
a transformer including:
a first winding that is electrically coupled between a common node of the first switch and the second switch of the switch unit and a common node of the first capacitor and the second capacitor of the capacitor unit at a primary side; and
a second winding and a third winding that are electrically coupled in series at a secondary side;
a rectifier unit electrically coupled to the second and third windings in parallel, and including a third switch and a fourth switch electrically coupled to each other; and
an output capacitor electrically coupled between a common node of the second and third windings, and a common node of the third and fourth switches, and disposed to be electrically coupled to the load in parallel, the output capacitor having a DC output voltage across two terminals thereof;
said control method comprising the steps of:
generating, based upon the DC output voltage, a first control signal and a second control signal with constant and equal frequencies,
respectively providing the first and second control signals to the first switch and the second switch;
respectively adjusting, based upon the DC output voltage, duty cycles of the first control signal and the second control signal, such that the first and second switches respectively make electrical connection when a voltage thereacross is close to zero;
generating a third control signal and a fourth control signal that are respectively provided to the third switch and the fourth switch, such that each of the third and fourth switches makes or breaks electrical connection according to a respective one of the third and fourth control signals;
configuring each of the third and fourth control signals to make logic transition that causes a respective one of the third and fourth switches to make electrical connection after, by a first predetermined time period, logic transition of a respective one of the first and second control signals that causes a respective one of the first and second switches to make electrical connection; and
configuring each of the first and second control signals to make logic transition that causes a respective one of the first and second switches to break electrical connection after, by a second predetermined time period, logic transition of a respective one of the third and fourth control signals that causes a respective one of the third and fourth switches to break electrical connection.

6. The control method according to claim 5, wherein:
when the first control signal has a logic level of 1, the first switch makes electrical connection;
when the second control signal has a logic level of 1, the second switch makes electrical connection;
when the third control signal has a logic level of 1, the third switch makes electrical connection;
when the fourth control signal has a logic level of 1, the fourth switch makes electrical connection;
when the first control signal has a logic level of 0, the first switch breaks electrical connection;
when the second control signal has a logic level of 0, the second switch breaks electrical connection;
when the third control signal has a logic level of 0, the third switch breaks electrical connection; and
when the fourth control signal has a logic level of 0, the fourth switch breaks electrical connection.

7. The control method according to claim 5, wherein each of the first, second and third windings has a polarity terminal and a non-polarity terminal, the polarity terminal of the third winding being electrically coupled to the non-polarity terminal of the second winding, the polarity terminal of the first winding being electrically coupled to a common node of the first switch and the second switch of the switch unit, the non-polarity terminal of the first winding being electrically coupled to a common node of the first capacitor and the second capacitor of the capacitor unit, the rectifier unit being electrically coupled between said polarity terminal of said second winding and said non-polarity terminal of said third winding.

8. The control method according to claim 7, wherein the transformer has a magnetizing inductor in parallel with the first winding, and a resonant inductor between the polarity terminal of the first winding and the common node of the first switch and the second switch, the quasi-resonant half-bridge converter having a resonant frequency associated with the resonant inductor, the first and second capacitors of the capacitor unit, the magnetizing inductor, the parasitic capacitor of the first switch and the parasitic capacitor of the second switch.

9. The control method according to claim 5, each of the first, second, third and fourth switches being an N-type power transistor, said control method further comprising:
configuring each of the third and fourth control signals to make transition from logic 0 to logic 1 after transition from logic 0 to logic 1 of a respective one of the first and second control signals by a first predetermined time period; and
configuring each of the first and second control signals to make transition from logic 1 to logic 0 after transition from logic 1 to logic 0 of the respective one of the third and fourth control signals by a second predetermined time period;
whereby each of the third and fourth switches makes electrical connection the first predetermined time period after a respective one of the first and second switches makes electrical connection, and each of the third and fourth switches breaks electrical connection the second predetermined time period before the respective one of the first and second switches breaks electrical connection.

\* \* \* \* \*